(12) United States Patent
Hirata et al.

(10) Patent No.: US 7,819,466 B2
(45) Date of Patent: Oct. 26, 2010

(54) ROOF APPARATUS

(75) Inventors: Tetsuya Hirata, Toyota (JP); Takashi Okamura, Iwakura (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 13 days.

(21) Appl. No.: 12/292,457

(22) Filed: Nov. 19, 2008

(65) Prior Publication Data

US 2009/0127891 A1 May 21, 2009

(30) Foreign Application Priority Data

Nov. 21, 2007 (JP) .............................. 2007-301988

(51) Int. Cl.
*B60J 7/00* (2006.01)
(52) U.S. Cl. ............................ 296/216.08; 296/203.03; 296/205
(58) Field of Classification Search ................................
296/216.06–216.08, 210, 187.12, 190.08, 296/187.13
See application file for complete search history.

(56) References Cited

U.S. PATENT DOCUMENTS

| | | | | |
|---|---|---|---|---|
| 6,102,472 A | * | 8/2000 | Wallstrom | 296/203.01 |
| 6,123,378 A | * | 9/2000 | Teply et al. | 296/29 |
| 6,481,788 B1 | * | 11/2002 | Moriyama et al. | 296/216.07 |
| 6,557,930 B1 | * | 5/2003 | Bruggemann et al. | 296/205 |
| 6,877,796 B2 | * | 4/2005 | Kimura | 296/187.13 |
| 7,258,396 B2 | | 8/2007 | Ida et al. | |
| 7,596,924 B2 | * | 10/2009 | Sakae | 52/802.1 |

FOREIGN PATENT DOCUMENTS

JP 2006-327250 12/2006

* cited by examiner

*Primary Examiner*—Dennis H Pedder
(74) *Attorney, Agent, or Firm*—Finnegan, Henderson, Farabow, Garrett & Dunner, LLP

(57) ABSTRACT

A roof apparatus for a vehicle includes a pair of guide rails adapted to be mounted and extending in a longitudinal direction of the vehicle along both sides of an opening provided at a vehicle roof, the pair of guide rails supporting a movable panel for opening and closing the opening and a frame extending in a width direction of the vehicle and connected with the guide rails, the frame made of a light alloy material and having a closed cross sectional shape when viewed in a direction perpendicular to a length direction thereof, the frame including a joining surface portion connected with each guide rail, an opposing surface portion opposing with the joining surface portion; and a hollow portion located between the joining surface portion and the opposing surface portion.

9 Claims, 2 Drawing Sheets

ROOF APPARATUS

CROSS REFERENCE TO RELATED APPLICATIONS

This application is based on and claims priority under 35 U.S.C §119 with respect to Japanese Patent Application 2007-301988, filed on Nov. 21, 2007, the entire content of which is incorporated herein by reference.

FIELD OF THE INVENTION

This invention relates to a roof apparatus opening and closing an opening provided at a vehicle roof. In particular, the invention relates to a roof apparatus including a frame which extends in a width direction of a vehicle and serves as a strength member.

BACKGROUND

A known roof apparatus used for a sun roof or the like, which opens and closes an opening provided at a roof, includes a frame extending in a width direction of a vehicle for securing vehicle strength required at a time of lateral collision.

This kind of roof apparatus includes a movable panel for opening and closing the opening and guide rails for guiding the movable panel. The guide rails extend in a longitudinal direction of the vehicle at left and right sides of the opening and are connected with each other by a frame. The frame is made of steel plates and the guide rails are made of an aluminum alloy. The frame and each guide rail are joined at recessed joining portions which fit into each other. The frame and the guide rail are joined by TOX® caulking which forms the joining portions in one process. Since material rigidity is different between the steel and the aluminum alloy, the frame includes a thin steel plate for interlocking the frame and each guide rail to be properly joined by TOX® caulking. Further, the frame includes a thick steel plate for securing necessary strength against a load of lateral collision, and the thin steel plate and thick steel plate are welded. For example, refer to JP 2006-327250A.

However, the frame of the roof apparatus shown in JP 2006327250 is formed by the two steel plates, thus increasing the weight. Further, welding is required, and the cost increases for welding. Furthermore, the cross sectional shape of the frame, formed by folding the steel plates, tends to bend easily by the load due to the lateral collision, which is applied to the frame in a length direction thereof. In other words, the frame is not likely to deform stably.

A need exists for a roof apparatus which is not susceptible to the drawback mentioned above.

SUMMARY OF THE INVENTION

According to an aspect of the present invention, a roof apparatus for a vehicle includes a pair of guide rails adapted to be mounted and extending in a longitudinal direction of the vehicle along both sides of an opening provided at a vehicle roof, the pair of guide rails supporting a movable panel for opening and closing the opening, and a frame extending in a width direction of the vehicle and connected with the guide rails, the frame made of a light alloy material and having a closed cross sectional shape when viewed in a direction perpendicular to a length direction thereof, the frame including a joining surface portion connected with each guide rail, an opposing surface portion opposing with the joining surface portion, and a hollow portion located between the joining surface portion and the opposing surface portion.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the invention will be described with reference to drawings.

Figure 1:
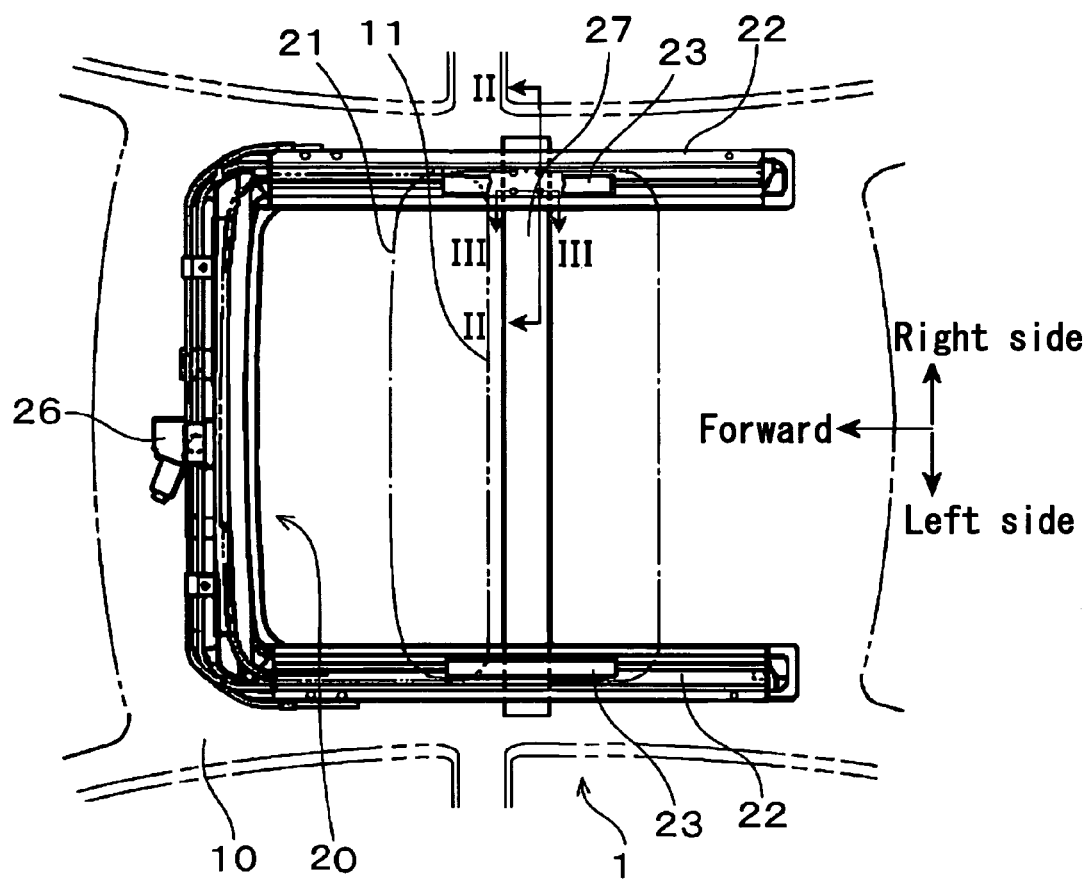
FIG. 1 is a plain view of a roof of a vehicle including a roof apparatus according to an embodiment of the invention.

FIG. 1 is a plain view showing a roof 10 of a vehicle 1. The roof 10 is provided with an opening 11. A roof apparatus 20, including a slide panel 21 for opening and closing the opening 11, is mounted to the roof 10.

The roof apparatus 20 is provided with a pair of guide rails 22. The guide rails 22 extend in a longitudinal direction of the vehicle 1 along left and right edges of the opening 11. A link mechanism 23 is mounted to each guide rail 22 and moves being guided by the guide rail 22. The slide panel 21 is supported by the link mechanisms 23. A driving device 26 included in the roof apparatus 20 is connected to the link mechanism 23 by a cable (not shown). The slide panel 21 is moved by operating the driving device 26 to open and close the opening 11. Further, a frame 27 is mounted to the roof apparatus 20 extending in a width direction of the vehicle 1 and connects the left guide rail 22 with the right guide rail 22.

Figure 2:
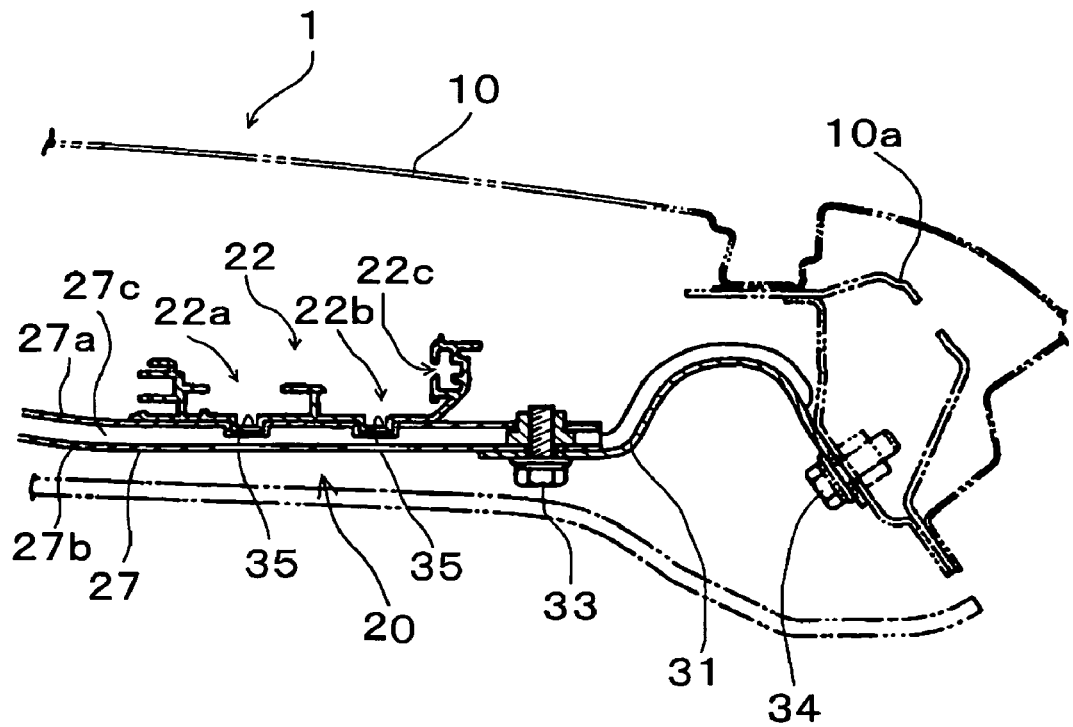
FIG. 2 is a sectional view taken along a line II-II in FIG. 1.

FIG. 2 is a sectional view taken along a line II-II of FIG. 1.

As shown in FIG. 2, each guide rail 22 includes multiple guide grooves 22a, 22b, and 22c for guiding movements of components of the roof apparatus 20 such as the link mechanism 23, a sunshade (not shown), a cable (not shown) and the like. The uniformly shaped guide rail 22 extends in a length direction thereof having a cross sectional shape in which the multiple guide grooves 22a, 22b, and 22c are included. The guide rails 22 are produced by extruding a light alloy such as a known aluminum.

Further, as shown in FIG. 2, the frame 27 is joined with the guide rail 22 by multiple joining portions 35 and is in contact with a lower surface of the guide rail 22.

Figure 3:
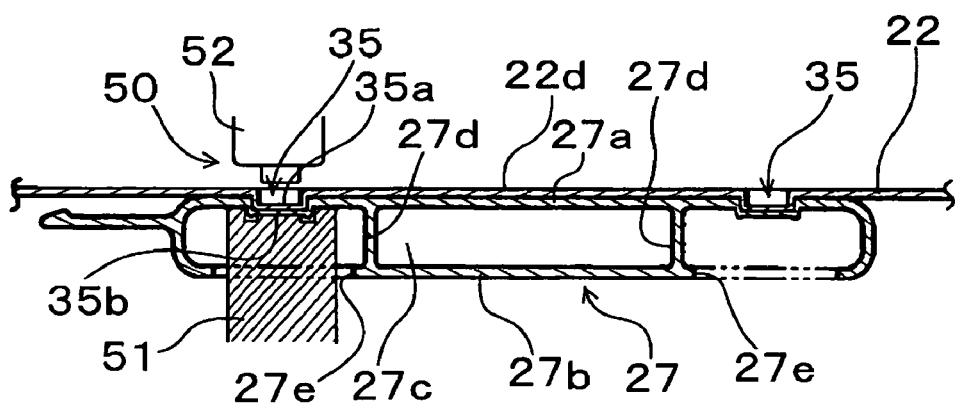
FIG. 3 is a sectional view taken along a line III-III in FIG. 1.

FIG. 3 is a sectional view taken along a line III-III of FIG. 1, showing a cross section cut in a direction perpendicular to the length direction of the frame 27. Shapes of the joining portions 35 and a method for forming the joining portion 35 by TOX®-caulking are shown.

As shown in FIG. 3, the frame 27 includes a joining wall (a joining surface portion) 27a and an opposing wall (an opposing surface portion) 27b. The joining wall 27a is located on a flat surface contacting with the lower surface of the guide rail 22. The opposing wall 27b is spaced a predetermined distance away from the joining wall 27a in a downward direction and is arranged in parallel with the joining wall 27a. The opposing wall 27b and the joining wall 27a oppose with each other. Both ends of the joining wall 27a and the opposing wall 27b are bent to be connected with each other, and a closed cross section is formed having a hollow portion 27c therein.

Multiple ribs 27d are formed in the hollowing portion 27c, and the joining wall 27a and the opposing wall 27b are connected by the ribs 27d. The hollow portion 27c with the ribs 27d is included in the closed cross sectional shape of the frame 27, and the frame 27 extends having the closed cross section. As with the guide rails 22, the frame 27 is produced by extruding a light alloy such as aluminum.

As shown in FIG. 3, an operation hole 27e is provided at the opposing wall 27b. A receiving jig 51, i.e. a caulking tool 50, is inserted from the operation hole 27e, and a punch tool 52 is extruded against a bottom surface 22d of the guide rail 22 by using a press machine and the like. Namely, caulking performed by extruding, such as TOX®-rivet, TOX®-clinch, and TOX®-caulking, is performed. As a result, recessed portions 35a and 35b are respectively formed at the guide rail 22 and the frame 27. The recessed portions 35a and 35b are simultaneously formed in one process and are fitted into each other to form the joining portion 35.

As shown in FIG. 2, a bracket 31 is mounted to an end portion of the frame 27 by a screw 33, and the bracket 31 is connected with a side member 10a of the roof 10 by a screw 34. Thus, the roof apparatus 20 is supported by the roof 10.

In the roof apparatus 20 including the frame 27 configured as just described, when the vehicle is sideswiped, a load of lateral collision is transmitted from the side member 10a to the frame 27 via the bracket 31. The frame 27 exerts resistance against the load of the lateral collision. Further, the frame 27 deforms stably due to the load of the lateral collision, thereby absorbing lateral collision energy.

The frame 27 extends in the width direction of the vehicle 1 along the roof 10 and bends in the length direction along the shape of the roof 10. Thus, when the frame 27 is subject to the load of the lateral collision, the frame 27 deforms so that the bend becomes sharper, thereby absorbing the lateral collision energy in the deformation process.

Compared to the frame disclosed in JP2006-327250A, which has the cross section formed by folding the plates, the frame 27, having the cross sectional shape in which the hollow portion 27c is formed, is able to maintain the cross sectional shape so as to be closer to the original shape even when the bend of the frame 27 becomes sharp. Thus, the frame 27 stably exerts the resistance against the load of the lateral collision until the bend becomes sharp, and a larger amount of the lateral collision energy is absorbed in the deformation process. Further, the frame 27 contributes to secure a space for protecting occupants in case of an emergency at the lateral collision.

Including the ribs 27d in the hollow portion 27c is advantageous for maintaining the cross sectional shape against larger deformation. Further, the lateral collision energy absorption characteristics of the frame 27 may be easily changed by changing the number and the thickness of the ribs 27d. Thus, the frame 27 may be applied to different kinds of vehicles which have different configurations and strength characteristics.

In a hollow member formed by extruding a light alloy, the cross section tends to expand. As with the joining wall 27a, locating the ribs 27d in the hollow portion 27c is advantageous for securing flatness of the frame 27 to uniformly contact with the guide rail 22 on the surface thereof. The ribs 27d allow the joining wall 27a to be uniformly joined with the bottom edge 22d of the guide rail 22, thus performing TOX® caulking in a stable manner. Consequently, the joining portion 35 is formed with high reliability.

Further, the frame 27 and the guide rail 22 are made of the light alloy materials, and thus equivalent material strength is obtained. Therefore, the recessed portions, formed by the TOX® caulking, are stably and equivalently formed in the frame 27 and the guide rail 22. Consequently, the joint portions 35 are formed with high reliability.

According to the embodiment of the invention, the frame 27 having the closed cross sectional shape in which the hollow portion 27c is included therein, maintains the cross sectional shape until the deformation becomes large in the process that the frame 27 receives the load and deforms. Thus, the frame 27 absorbs the larger amount of the lateral collision energy. Further, when the frame 27 configured as described above is made of the light alloy, the frame 27 may be produced by extrusion. Thus, welding is not necessary, resulting in cost reduction.

According to the embodiment of the invention, locating the ribs 27d in the hollow portion 27c makes maintaining the cross sectional shape easier against the lateral collision lateral. Thus, stability of deformation strength is enhanced.

According to the embodiment of the invention, the joining portions 35 of the frame 27 and the guide rails 22, made of the light alloy, are formed in the recessed shape, which are fitted to each other, in one process by TOX® caulking. Thus, The joint portions 35 are produced at a lower cost and attain high reliability.

The principles, of the preferred embodiments and mode of operation of the present invention have been described in the foregoing specification. However, the invention, which is intended to be protected, is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A roof apparatus for a vehicle comprising:
a pair of guide rails adapted to be mounted and extending in a longitudinal direction of the vehicle along both sides of an opening provided at a vehicle roof, the pair of guide rails supporting a movable panel for opening and closing the opening; and
a frame extending in a width direction of the vehicle, the frame being connected at its opposite ends and connected with the guide rails, respectively, the frame being made of a light alloy material and having a closed cross sectional shaped structure when viewed in a direction perpendicular to a length direction thereof,
the closed sectional shaped structure of the frame including:
a joining surface portion connected at first and second portions that are spaced-apart in the vehicle longitudinal direction with a lower surface of each guide rail;
an opposing surface portion opposing with the joining surface portion;
a hollow portion located between the joining surface portion and the opposing surface portion; and
at least one rib connecting the joining surface portion and the opposing surface portion and dividing the hollow portion in the vehicle longitudinal direction, the at least one rib being positioned proximate an opening in the opposing surface portion.

2. A roof apparatus for a vehicle according to claim 1, wherein the at least one rib comprises first and second ribs spaced apart in the vehicle longitudinal direction, connecting the joining surface portion and the opposing surface portion, and dividing the hollow portion into first, middle, and second divisions, the first and second ribs positioned proximate respective first and second openings in the opposing surface portion.

3. A roof apparatus for a vehicle according to claim 1, wherein the frame has a joining portion formed at the joining surface portion, and the joining portion is formed in a recessed shape to be fitted with the guide rail.

4. A roof apparatus for a vehicle according to claim 2, wherein, the first and second openings in the opposing surface portion are spaced-apart in the vehicle longitudinal direction, the first opening penetrating into the first division of the hollow portion and being in alignment with the first portion, the second opening penetrating into the second division of the hollow portion and being in alignment with the second portion.

5. A roof apparatus for a vehicle according to claim 1, further comprising:
   a pair of brackets connected with ends of the frame extending in the width direction of the vehicle and adapted to be connected with a side member of the vehicle.

6. A roof apparatus for a vehicle according to claim 1, wherein the closed sectional shaped structure extends along an entire extending direction of the frame.

7. A roof apparatus for a vehicle comprising:
   a pair of guide rails adapted to be mounted and extending in a longitudinal direction of the vehicle along both sides of an opening provided at a vehicle roof, the pair of guide rails supporting a movable panel for opening and closing the opening; and
   a frame extending in a width direction of the vehicle, the frame being connected at its opposite ends with the guide rails, respectively, the frame being made of a light alloy material and having a closed cross sectional shaped structure when viewed in a direction perpendicular to a length direction thereof,
   the closed sectional shaped structure of the frame including:
      a joining surface portion connected with each guide rail;
      an opposing surface portion opposing with the joining surface portion; and
      a hollow portion located between the joining surface portion and the opposing surface portion, the hollow portion being divided into first, middle, and second divisions by spaced-apart ribs, each of which connects the joining surface portion and the opposing surface portion, each of the first and second divisions formed to open outwardly, each of the spaced-apart ribs being positioned proximate respective first and second spaced apart openings in the opposing surface portion.

8. A roof apparatus for a vehicle according to claim 7, wherein the joining surface portion of the closed sectional shaped structure is connected with a lower surface of each guide rail.

9. A roof apparatus for a vehicle according to claim 7, wherein the first opening penetrates into the first division of the hollow portion, and the second opening penetrates into the second division of the hollow portion.

* * * * *